US009379821B2

(12) United States Patent
Guo et al.

(10) Patent No.: US 9,379,821 B2
(45) Date of Patent: Jun. 28, 2016

(54) OPTICAL RECEIVER

(71) Applicants: Wei-Hua Guo, Dublin (IE); John F. Donegan, Co. Kildare (IE); Qiaoyin Lu, Dublin (IE)

(72) Inventors: Wei-Hua Guo, Dublin (IE); John F. Donegan, Co. Kildare (IE); Qiaoyin Lu, Dublin (IE)

(73) Assignee: THE PROVOST, FELLOWS, FOUNDATION SCHOLARS, AND THE OTHER MEMBERS OF BOARD, OF THE COLLEGE OF THE HOLY AND UNDIVIDED TRINITY OF QUEEN ELIZABETH NEAR DUBLIN (IE)

( * ) Notice: Subject to any disclaimer, the term of this patent is extended or adjusted under 35 U.S.C. 154(b) by 0 days.

(21) Appl. No.: 13/627,522

(22) Filed: Sep. 26, 2012

(65) Prior Publication Data
US 2013/0077980 A1    Mar. 28, 2013

Related U.S. Application Data

(60) Provisional application No. 61/539,077, filed on Sep. 26, 2011.

(51) Int. Cl.
*H04B 10/61* (2013.01)
*G02B 27/28* (2006.01)
*G02F 1/01* (2006.01)

(52) U.S. Cl.
CPC .............. *H04B 10/61* (2013.01); *G02B 27/283* (2013.01); *H04B 10/614* (2013.01); *G02F 2001/0144* (2013.01)

(58) Field of Classification Search
CPC ................ H04B 10/614; G02B 27/283; G02F 2001/0144
See application file for complete search history.

(56) References Cited

U.S. PATENT DOCUMENTS

| 5,953,479 A * | 9/1999 | Zhou et al. ..................... 385/131 |
| 2005/0169567 A1* | 8/2005 | Bernasconi et al. ............ 385/11 |
| 2012/0106984 A1* | 5/2012 | Jones et al. ................... 398/214 |

* cited by examiner

*Primary Examiner* — Nathan Curs
(74) *Attorney, Agent, or Firm* — Volpe and Koenig, P.C.

(57) ABSTRACT

The invention provides a solution for the full integration of a coherent receiver on Indium Phosphide (InP) or other material that has a number of advantages over current coherent receiver design. PIN waveguides can be reverse biased and forward biased to modify the mode effective index so as to realize an integrated polarization beam splitting function and the 90 degree optical hybrid. The fabrication tolerance is therefore greatly increased; resulting in much reduced complexity and cost for the final receiver.

20 Claims, 4 Drawing Sheets

OPTICAL RECEIVER

This application claims the benefit of U.S. provisional patent application No. 61/539,077, filed Sep. 26, 2011, which is incorporated by reference as if fully set forth.

FIELD OF INVENTION

The invention relates to a coherent receiver for use in a communication network, and in particular for use in high speed optical networks.

BACKGROUND

The demand for upgrading the spectral efficiency of optical networks is ever increasing as internet traffic continues to increase almost exponentially. The move from 10 G to 40 G has been proposed for some time, but has not yet become the norm in optical communications. There are economic reasons behind this, such as the internet bubble in the early 2000s. But the main reason is still that the technology has not been good enough. The presently widely deployed 10 G system employs the NRZ-OOK amplitude modulation format and the direct detection scheme and the DWDM system (50 G channel spacing).

Erbium Doped Fibre Amplifiers (EDFAs) and chromatic dispersion compensation modules are used to compensate loss and dispersion along the optical link in a periodic manner. Directly upgrading such a system to 40 G by simply using a 40 G NRZ-OOK modulation format and the direct detection scheme and the same optical link will not be possible. There are two main reasons to impede this. The first one is channel spacing. The 40 G NRZ-OOK signal cannot be put on channels with 50 G spacing. The other reason is that 40 G NRZ-OOK signal has much less tolerance to chromatic dispersion and polarization mode dispersion than 10 G so it can not directly propagate on present optical links.

Of more importance, there is a lot of work carried out around the world to try to change the NRZ-OOK modulation format and the direct detection scheme to other more advanced phase modulation formats and detection schemes. The main direction of innovation is to reduce the symbol rate by increasing the number of bits of information carried by each symbol. The most sophisticated and also the most successful is the Dual-Polarization Quadrature-Phase Shift Keying (DP-QPSK) format combined with the digital coherent detection scheme. For this scheme each symbol carries four bits of information, which means that a 40 G signal can be achieved with a 10 G symbol rate. It is easily understandable that this 40 G signal would comply with all the requirements of presently available 10 G systems but a coherent receiver is now essential for operation. Due to the digital coherent detection scheme, the signal's amplitude and phase are detected and digitized so all the dispersions and non-linear impairments that the signal has suffered from the optical link can be compensated at the end using sophisticated digital filters. So this 40 G system, if implemented, is actually a huge improvement over the original 10 G NRZ-OOK system.

But these benefits will not come along without costs and more complicated network architectures. The DP-QPSK modulation formats will need more complex transmitters. The digital coherent detection scheme needs a full coherent receiver (dual polarization and dual quadrature). Currently commercially available coherent receivers are based on miniaturized free-space optics. Many optical elements like mirrors, splitters, and photodetectors are needed to be positioned very precisely. This makes this type of detector less competitive in terms of volume, cost, yield and reliability. There are also schemes to use hybrid integration that is to use for example Silica optical circuits to form the polarization beam splitters and optical hybrids and then couple these passive optical circuits to photodetectors. This type of hybrid integration still needs precise alignment between passive waveguides and photodetectors. Integrating all of these optical components onto a single chip would be strongly desired. Considering the material for photon detection at the optical wavelength used for optical communications is mainly Ge on Silicon or InGaAs on InP, the natural integration platform would be Silicon based or InP based. However realizing the functions of polarization beam splitters and optical hybrids on these two material platforms is problematic, especially for polarization beam splitters.

A known coherent receiver, as shown in FIG. 1, requires two polarization beam splitters (PBS), two 90 degree optical hybrids, and 8 high speed photodiodes (4 balanced photodiodes (BPD)). At the moment all commercially available coherent receivers are based on miniaturized free-space optics. In the long run and for large scale manufacture an integration scheme to realize such a complex receiver is essential. In the 2009 Optical Fibre Communication (OFC) conference Alcatel-Lucent demonstrated such a receiver integrated on silicon. However, the relatively mature approaches are still based on miniaturized free-space optics. As such, these are expensive solutions due to the requirement to physically integrate all the various components.

The available commercial products include the single polarization 90 degree optical hybrid, dual polarization 90 degree optical hybrid from Kylia, http://kylia.com/compa.html and a single polarization 90 degree optical hybrid from Optoplex, http://www.optoplex.com/Index.htm. However a problem with these solutions is that they are still optical hybrids which have to be combined with balanced photodiodes and fibre connections to form a functioning coherent receiver. This is very challenging and therefore costly because the fibre connection length must be controlled to high precision. To avoid the difficulty for the accurate fibre length control, the balanced photodiodes can be installed together with the optical hybrids. This has been done by the company CeLight who uses a $LiNbO_3$ based optical hybrid, http://www.celight.com/.

At the 2011 Optical Fibre Communication (OFC) conference there were two reports on integrated coherent receivers one from Alcatel-Lucent who did the integration on silicon (as mentioned above). The second report is from $u^2t$ which is a German company specialized on making high speed photodiodes and balanced photodiodes. They have managed to integrate one 90 degree optical hybrid and four photodiodes (two balanced photodiodes) on a single chip. In their integration the 90 degree optical circuit is realized by a 4 by 4 MMI (Multi-Mode Intererometer) beam splitter which is simple but has very tight fabrication tolerance. There will be difficulties to further integrate the polarization beam splitter because the waveguides are ion-doped so they are purely passive.

It is therefore an object of the invention to provide a coherent receiver to overcome the above mentioned problems.

SUMMARY

According to the present invention there is provided, as set out in the appended claims, an integrated receiver system for use in an optical network, said system comprising:
an indium phosphide layer or other semiconductor base; and a PIN waveguide layer adapted to be reverse biased and/or forward biased to modify a mode effective index of the waveguide so as to provide an integrated a polarization beam splitting function and a 90 degree optical hybrid function.

The invention provides a solution for the full integration of a coherent receiver on InP that has a number of advantages. PIN (p-type, intrinsic, n-type) waveguides can be reverse biased and forward biased to modify the mode effective index so as to realize the polarization beam splitting function and the 90 degree optical hybrid. The fabrication tolerance is therefore greatly increased; resulting in much reduced complexity and cost for the final receiver. The high speed balanced photodiodes can be integrated on top of the PIN waveguide layer. The alignment between the PIN waveguide and the photodiode is ensured by high precision optical lithography.

In one embodiment the waveguide is forward biased to inject current into a current region to change the effective index of a transverse electric mode and transverse magnetic mode simultaneously.

In one embodiment the waveguide is reverse biased to provide an electric field inside a current region such that the electric field will only change the effective index of a transverse electric mode so as to realize the polarization beam splitting function through a Mach-Zehnder interferometer.

In one embodiment the forward biasing compensates for phase error of the 90 degree optical hybrid.

In one embodiment there is provided a means for controlling the forward and reverse biasing.

In one embodiment the polarization beam splitting function comprises a Mach-Zehnder interferometer.

In one embodiment the optical hybrid function comprises two-by-two beam splitters adapted to receive a current injection to generate 90 degree phase shift.

In one embodiment there is provided a PIN detector.

In one embodiment the PIN detector comprises a plurality of photodiodes.

In one embodiment there is provided a coupler adapted to provide a transition from the waveguide to at least one photodiode.

In one embodiment there is provided at least two photodiodes connected in series.

In one embodiment at least one photodiode is optimized by controlling the photodiode absorption thickness.

In another embodiment of the invention there is provided an integrated receiver system for use in an optical network, said system comprising:
a base layer; and
a PIN waveguide layer adapted to be reverse biased and/or forward biased to modify a mode effective index of the waveguide so as to provide an integrated a polarization beam splitting function and a 90 degree optical hybrid function.

In a further embodiment of the present invention there is provided a Mach-Zehnder interferometer based polarization beam splitter comprising a PIN waveguide layer adapted to be reverse biased and/or forward biased to modify a mode effective index of the waveguide so as to provide an integrated polarization beam splitting function.

In another embodiment there is provided an integrated receiver system for use in an optical network, said system comprising:
an indium phosphide layer or other semiconductor base with polarization beam splitter, 90 degree optical hybrid and high speed balanced photodiodes; in which
a PIN waveguide layer is adapted to be reverse biased and/or forward biased to modify a mode effective index of the waveguide so as to provide an integrated polarization beam splitting function and a 90 degree optical hybrid function.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE PREFERRED EMBODIMENTS

Figure 1:
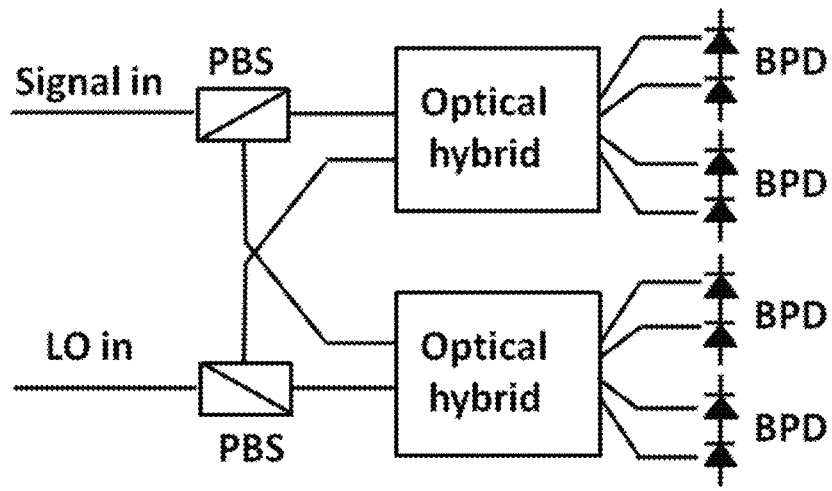
FIG. 1 illustrates a prior art schematic diagram of a full coherent receiver.
Figure 2:
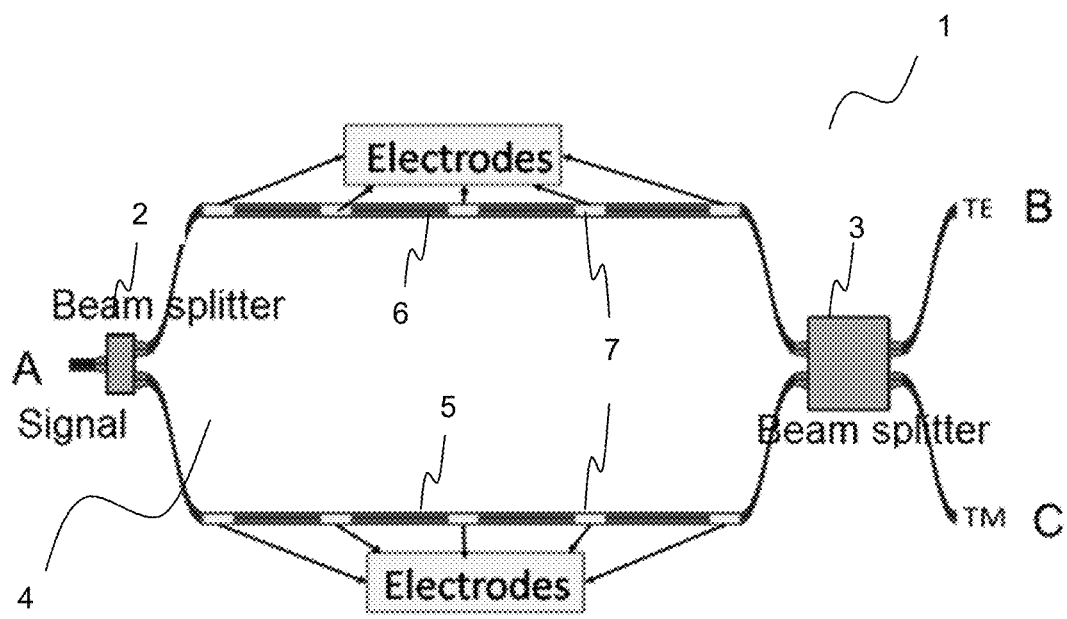
FIG. 2 illustrates schematically a proposed polarization beam splitter structure according to one aspect of the invention.

FIG. 2 shows schematically a polarization beam splitter structure according to one aspect of the invention, indicated generally by the reference numeral 1, comprising two beam splitters 2 and 3. The structure is based on PIN (p-type, intrinsic, n-type) passive waveguides and comprises a Mach-Zehnder interferometer 4. The Mach-Interferometer 4 comprises two arm portions 5 and 6. Each arm 5, 6 comprises at least one or more electrodes 7, for example in the form of metal contacts on each arm of the interferometer. The waveguide 4 can be forward biased with current injection which will change the index of both transverse electric mode and transverse magnetic mode and will accumulate phase shift on one arm of the interferometer 5. This phase shift can be used to compensate any phase errors accumulated in the fabrication so that both transverse electric mode and transverse magnetic mode can be directed to one output port of the interferometer. Then the other arm 6 of the interferometer is adapted to be reversed biased with a strong electric field established in the depletion of the PIN waveguide. This electric field will only mainly change the index of the transverse electric mode through the first order electro-optical effect i.e. the Pockels effect. This index change will therefore only cause phase change for the transverse electric mode. And this phase change will move the transverse electric mode from one output port of the interferometer to the other output port when it reaches Pi, so as to realize the polarization beam splitting function.

Figure 3A:
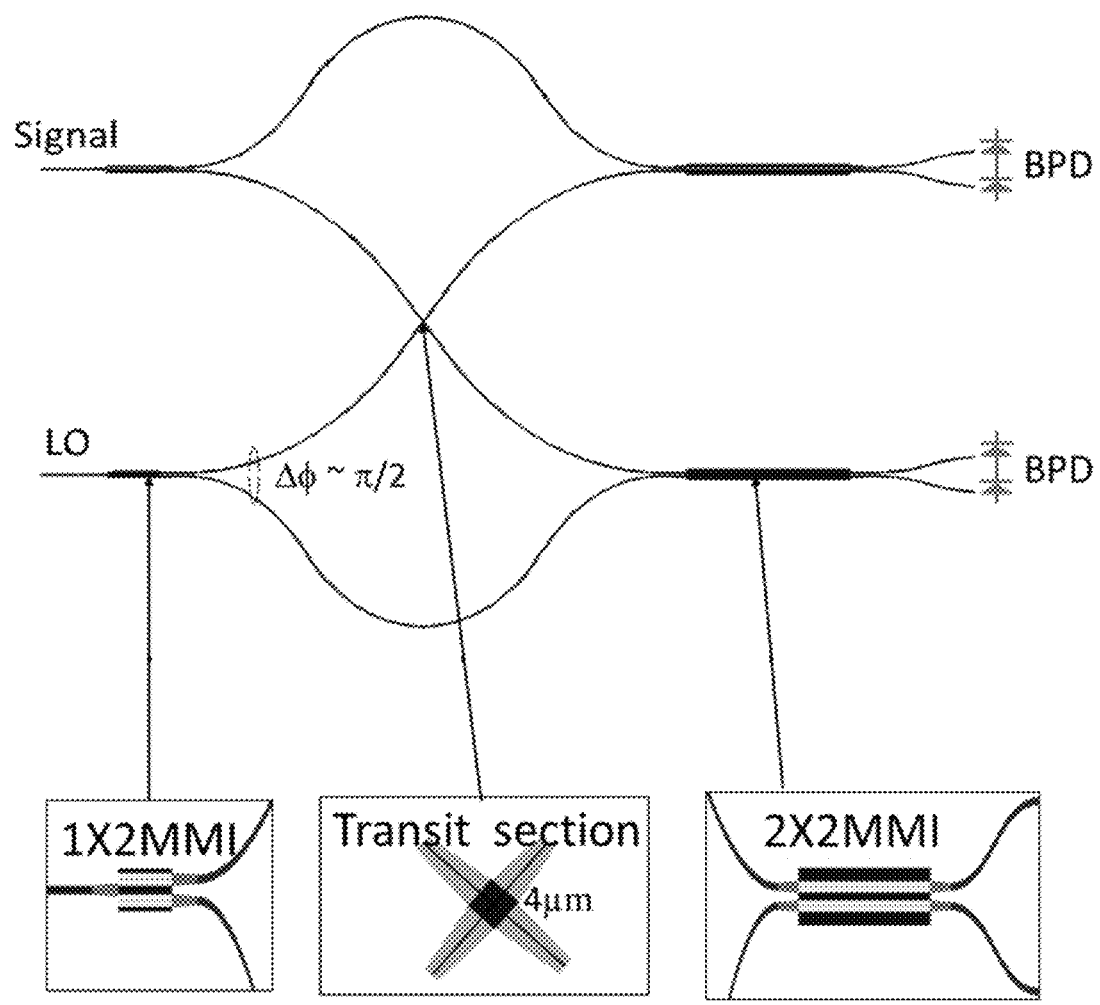
FIG. 3 illustrates a schematic diagram of (a) a 90 degree optical hybrid and (b) a single waveguide fed photodiode, according to one embodiment of the invention.
Figure 3B:
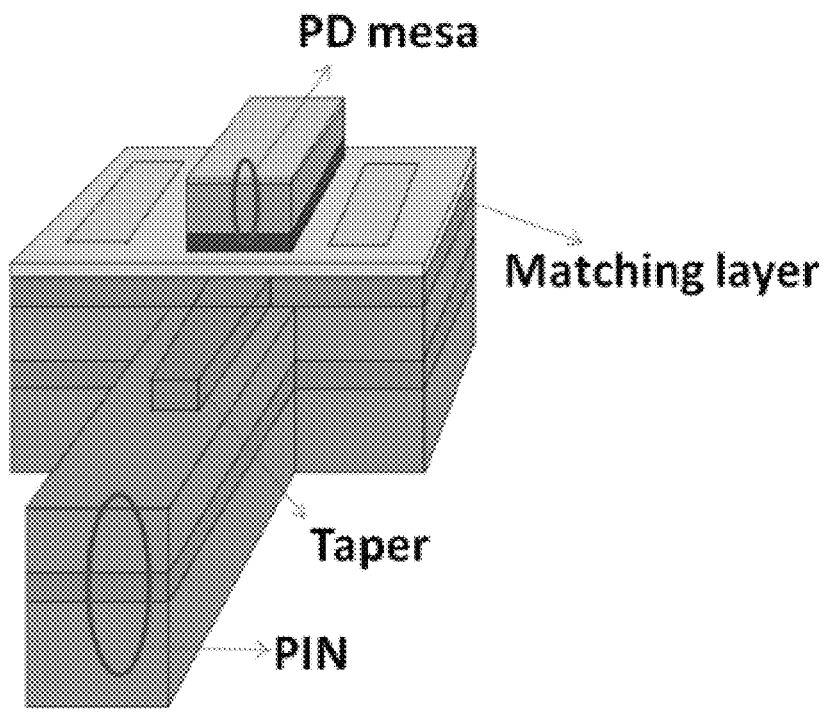

Referring to FIGS. 3(a) and 3(b) an integrated receiver system for use in an optical network, the system comprising an indium phosphide layer or base is shown. A PIN waveguide is positioned under a PIN detector instead of the usual ion doped waveguide. PIN waveguides can be reverse biased and forward biased to modify the mode effective index so as to realize the polarization beam splitting function and the 90 degree optical hybrid. The fabrication tolerance is therefore greatly increased; this will result in much reduced cost for the final receiver.

The PIN waveguide layer is adapted to be reverse biased and/or forward biased to modify a mode effective index of the waveguide (described in more detail below) so as to provide an integrated a polarization beam splitting function and a 90 degree optical hybrid function. The waveguide is forward biased to inject current into a current region to change the effective index of a transverse electric mode and transverse magnetic mode simultaneously. The waveguide is reverse biased to provide an electric field inside a current region such that the electric field will only change the effective index of a transverse electric mode.

FIG. 3(a) shows schematically the 90 degree optical hybrid structure. One of the PIN waveguides can be forward biased to injected currents. The current will cause phase shift which can be used to compensate any phase errors accumulated in the fabricated structure and also generate the 90 degree phase shift required by the optical hybrid.

FIG. 3(b) shows schematically in 3D the vertical coupler that can be used to transfer the optical modes from the lower PIN passive waveguides to the upper photodiodes (PD). A width tapered waveguide on top of the PIN waveguide can be used to index match the PIN waveguide so as to make the mode transfer from the PIN waveguide to the tapered waveguide first. The tapered waveguide layer is also the N contact layer of the photodiode. The mode from the tapered waveguide will transfer further up quickly through a matching layer between the tapered waveguide layer and the absorption layer of the photodiode, and then being absorbed by the absorption layer.

Figure 4A:
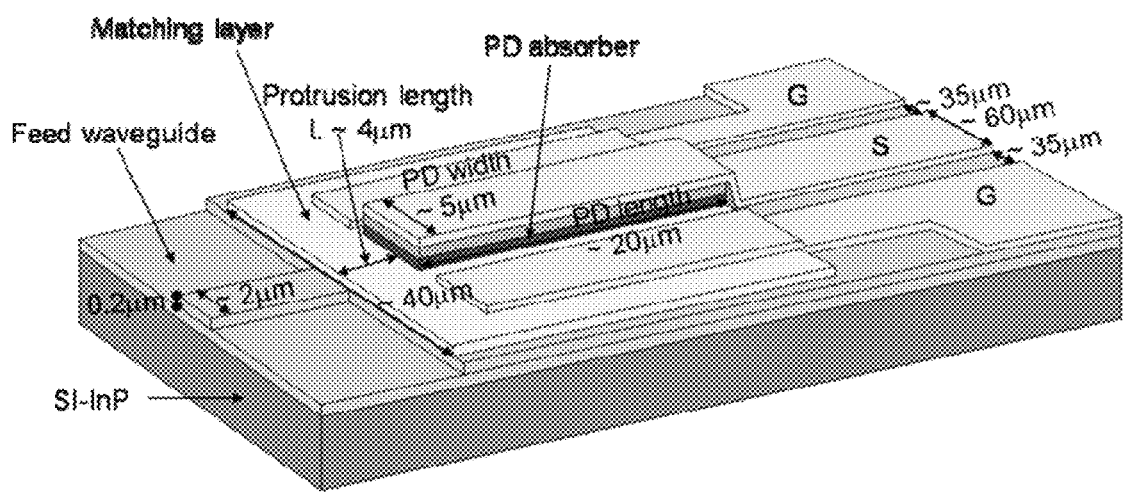
FIGS. 4 (a) & (b) illustrates a more detailed 3D perspective view and section view of FIG. 3, according to a further embodiment of the invention.

FIGS. 4 (a) and (b) show a typical high speed photodiode structure which can be put above the PIN passive waveguide circuit. The feed waveguide in FIG. 4(a) will be tapered as in FIG. 3(b) to match the index of the PIN waveguide below so the mode can be transferred from the PIN waveguide to the photodiode to be absorbed.

To demonstrate a fully integrated coherent receiver of the present invention the waveguide based polarization beam splitters, 90 degree optical hybrids, and balanced photodiodes are now described in detail and how they can be implemented in an integrated platform:

1. Mach-Zehnder (MZ) Interferometer Based Polarization Beam Splitter (PBS)

The fundamental InP waveguides used to realize the PBS and the optical hybrid are both PIN structures. The PIN structure can be forward biased to inject current into the i-region which can change the effective index of both the transverse electric (TE) and transverse magnetic (TM) mode simultaneously.

It is also possible to reverse bias the PIN structure to establish a strong electric field inside the i-region. This electric field will only change the effective index of the TE mode through the Pockels effect (the first order electrooptic effect), leaving the TM mode unchanged.

The working principle of the PBS is as follows: for a perfect fabrication the TE and TM modes will both come out from port C (see FIG. 2). There could be imperfections from practical fabrications which cause phase errors so both modes do not completely emerge from port C. It is possible to inject current into one arm of the interferometer, through forward biasing, to compensate this phase error. On the other arm a reverse bias voltage can be applied which will move the TE mode from port C to B completely. Such a voltage is called $V_\pi$ of the interferometer. Now the TE mode outputs from port B and TM mode outputs from port C therefore the polarization beam splitting function has been realized. The extinction ratio of this polarization splitting is actually the extinction ratio of the interferometer which can be easily made larger than 20 dB which is already comparable to the commercial PBS using bulk optical elements.

The ability to control the modes in this PIN structure through forward and reverse biasing is essential for the integration.

2. 90 Degree Optical Hybrid

In one embodiment the design comprises two 1×2 beam splitters, four waveguide arms and two 2×2 beam splitters as shown in FIG. 3(a) to realize a waveguide based 90 degree optical hybrid (OH). The signal and local oscillator (LO) are launched into corresponding polarization beam splitters and separated into the TE and TM modes. The signal and LO components enter the OH for each polarisation state. The example design is shown with the parameters in FIG. 3(a), where taper transitions are introduced into the cross section between the two crossed arms to decrease propagation loss.

In one embodiment it is possible to use current injection to generate the necessary 90 degree phase shift.

3. Waveguide Fed Balanced Photodiodes

Figure 4B:
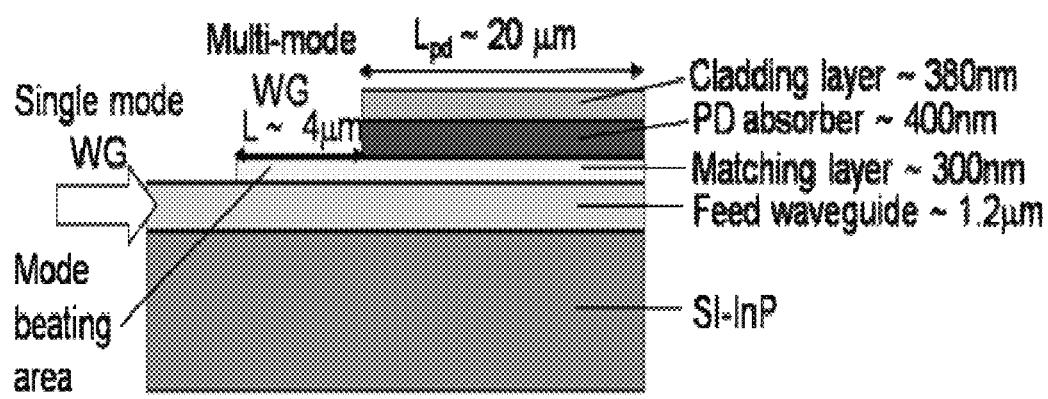

A single detector structure is schematically shown in FIG. 3(b) and FIGS. 4(a) and 4(b). The PIN waveguide (optical circuit waveguide) used to realize the PBS and the 90 degree optical hybrid is grown under a detector PIN waveguide. The transition from the optical circuit waveguide to the photodiode is realized by a vertical coupler as shown in FIG. 3(b). The coupler needs to have low loss, low polarization sensitivity, and high fabrication tolerance.

The balanced photodiode is realized by connecting two identical photodiodes on a chip in series. It is preferred to realize a balanced photodiode with speed higher than 25 G, so it can be used for the 40 G and the 100 G optical network with advanced modulation formats such as PM-QPSK. From the design point of view, the Photo Diode (PD) absorption thickness needs to be optimized because it directly influences the capacitance so the RC time of the PD, the carrier transit time of the PD, and the quantum efficiency of the PD. For the fabrication, the P doping control during the wafer growth is quite important. So a MBE (Molecular Beam Epitaxy) growth with Be doping is preferable. If selecting MOCVD growth, the diffusion of the P dopant Zinc is an issue and needs careful control. From the fabrication side, another issue in the design is to reduce the parasitic capacitance and series resistance.

It will be appreciated that the integrated coherent receiver can include the following design features:

1. The optical loss of the PIN waveguide. The loss will be controlled by controlling the doping level and thickness of the cladding layers of the PIN waveguide.

2. The fabrication tolerance of the vertical coupler. A three-section taper can be used to increase the fabrication tolerance.

3. Ion implantation of the PIN structure.

4. The balance of the two by two beam splitter exactly before the balanced photodiodes. A specific MMI with width that is relatively broader than normal will be used to make this beam splitter so as to increase the fabrication tolerance.

5. Common mode rejection ratio of the balanced photodiode. Two photodiodes with identical optical and electric structures can be used to increase the symmetry.

It will be appreciated that while silicon photodiodes could potentially have a cost advantage it is far less mature than InP photodiodes when working with infrared wavelengths. The communication wavelength extensively used is around 1550 nm. The design of the present invention demonstrates a fully integrated coherent receiver on indium phosphide InP. This receiver will provide network suppliers, with an essential optoelectronic component to greatly increase the transmission capacity of the installed optical fibre network.

It will be appreciated that integration of all of these elements, as hereinbefore described, onto a single chip will have the advantages of compactness, robustness, and low cost. This integrated receiver has huge commercial potential and will mark a sea-change in the operation of optical networks.

In the specification the terms "comprise, comprises, comprised and comprising" or any variation thereof and the terms "include, includes, included and including" or any variation thereof are considered to be totally interchangeable and they should all be afforded the widest possible interpretation and vice versa.

The invention is not limited to the embodiments hereinbefore described but may be varied in both construction and detail.

What is claimed is:

1. An integrated receiver system comprising:
   a semiconductor base; and
   a PIN waveguide layer configured to be forward biased to provide an optical hybrid function and reverse biased to provide a polarization beam splitting function, wherein the forward biasing is applied to the PIN waveguide layer to compensate for phase errors in an optical hybrid of the receiver system so as to provide a 90 degree optical hybrid function and wherein the reverse biasing is applied to the PIN waveguide layer to modify a mode effective index of the waveguide so as to provide a polarization beam splitting function.

2. The receiver system of claim 1 semiconductor base comprises at least one of: a polarization beam splitter, a 90 degree optical hybrid, or a photodiode.

3. The receiver system of claim 1 wherein the waveguide is forward biased to inject current into a waveguide to change the effective index of a transverse electric mode and transverse magnetic mode simultaneously.

4. The receiver system of claim 1 wherein the waveguide is reverse biased to provide an electric field across the waveguide such that the electric field will only change the effective index of a transverse electric mode.

5. The receiver system of claim 1 comprising means for controlling the forward and reverse biasing.

6. The receiver system of claim 1 wherein the PIN waveguide layer comprises a Mach-Zehnder interferometer.

7. The receiver system of claim 1 wherein the 90 optical hybrid function comprises two-by-two beam splitters adapted to receive a current injection to generate a 90 degree phase shift.

8. The receiver system of claim 1 comprising a PIN detector.

9. The receiver system of claim 8 wherein the PIN detector comprises a plurality of photodiodes.

10. The receiver system of claim 8 comprising a coupler adapted to provide a transition from the waveguide to at least one photodiode.

11. The receiver system of claim 8 comprising at least two photodiodes connected in series or in parallel.

12. The receiver system of claim 8 wherein the photodiode absorption thickness of at least one photodiode is controlled.

13. The receiver system of claim 1 comprising at least one cladding layer positioned on top of the PIN waveguide.

14. The receiver system of claim 13 comprising a predetermined doping level and thickness of at least one cladding layer.

15. The integrated receiver system of claim 1 wherein the polarization beam splitting function has an extinction function larger than 20 dB.

16. The integrated receiver system of claim 1 wherein the semiconductor base is an indium phosphide layer.

17. An interferometer based polarisation beam splitter comprising a PIN waveguide layer configured to be forward biased to provide an optical hybrid function and reverse biased to provide a polarization beam splitting function, wherein the forward biasing is applied to the PIN waveguide layer to compensate for phase errors in an optical hybrid of a receiver system so as to provide a 90 degree optical hybrid function and wherein the reverse biasing is applied to the PIN waveguide layer to modify a mode effective index of the waveguide so as to provide a polarization beam splitting function.

18. The interferometer based polarisation beam splitter of claim 17 wherein the polarization beam splitting function has an extinction function larger than 20 dB.

19. An integrated receiver system comprising:
    a base layer; and
    a PIN waveguide layer configured to be forward biased to provide an optical hybrid function and reverse biased to provide a polarization beam splitting function, wherein the forward biasing is applied to the PIN waveguide layer to compensate for phase errors in an optical hybrid of the receiver system so as to provide a 90 degree optical hybrid function and wherein the reverse biasing is applied to the PIN waveguide layer to modify a mode effective index of the waveguide so as to provide a polarization beam splitting function.

20. The integrated receiver system of claim 19 wherein the polarization beam splitting function has an extinction function larger than 20 dB.

* * * * *